United States Patent
Hefner et al.

(10) Patent No.: US 7,546,946 B2
(45) Date of Patent: Jun. 16, 2009

(54) MULTIFUNCTION, DIRECT THERMAL RECORDING MATERIAL

(75) Inventors: Stephen P. Hefner, Longmeadow, MA (US); Kazuhiro Fujita, Amherst, MA (US)

(73) Assignee: Kanzaki Specialty Papers, Inc., Ware, MA (US)

( * ) Notice: Subject to any disclaimer, the term of this patent is extended or adjusted under 35 U.S.C. 154(b) by 566 days.

(21) Appl. No.: 11/170,245

(22) Filed: Jun. 28, 2005

(65) Prior Publication Data

US 2005/0284930 A1 Dec. 29, 2005

Related U.S. Application Data

(60) Provisional application No. 60/583,722, filed on Jun. 29, 2004.

(51) Int. Cl.
*G06K 5/00* (2006.01)
(52) U.S. Cl. .................. 235/380; 235/375; 235/488
(58) Field of Classification Search ............... 235/380, 235/375, 379, 488; 283/107
See application file for complete search history.

(56) References Cited

U.S. PATENT DOCUMENTS

| | | | |
|---|---|---|---|
| 4,694,148 A * | 9/1987 | Diekemper et al. | 235/468 |
| 4,727,055 A | 2/1988 | Aoyagi et al. | |
| 5,359,183 A * | 10/1994 | Skodlar | 235/493 |
| 5,643,851 A | 7/1997 | Konagaya et al. | |
| 5,721,781 A | 2/1998 | Deo et al. | |
| 5,955,961 A | 9/1999 | Wallerstein | |
| 6,000,607 A | 12/1999 | Ohki et al. | |
| 6,047,888 A | 4/2000 | Dethloff | |
| 6,193,163 B1 | 2/2001 | Fehrman et al. | |
| 6,199,144 B1 | 3/2001 | Arora et al. | |
| 6,202,932 B1 | 3/2001 | Rapeli | |
| 6,244,514 B1 | 6/2001 | Otto | |
| 6,247,644 B1 | 6/2001 | Horne et al. | |
| 6,257,486 B1 | 7/2001 | Teicher et al. | |
| 6,394,356 B1 * | 5/2002 | Zagami | 235/487 |
| 6,424,029 B1 | 7/2002 | Giesler | |
| 6,485,319 B2 | 11/2002 | Bricaud et al. | |
| 6,824,066 B2 * | 11/2004 | Weyant | 235/493 |

(Continued)

FOREIGN PATENT DOCUMENTS

EP 1 031 433 A 8/2000

(Continued)

*Primary Examiner*—Ahshik Kim
(74) *Attorney, Agent, or Firm*—Holland & Bonzagni, P.C.; Mary R. Bonzagni, Esq.

(57) ABSTRACT

A multifunction, direct thermal recording material made up of a base support having opposing planar surfaces, at least one thermal layer formed on at least one such planar surface for displaying a digital photographic image, graphical, numerical or textual information, or combinations thereof, and at least one machine readable information storage system (e.g., magnetic stripes, bar codes, RFIDs) contained on or within the base support and/or the thermal recording layer, is provided. In one embodiment, the inventive multifunction, direct thermal recording material is a hotel or hospitality establishment guest card which serves as both an identification card as well as a room access "key card", and in another embodiment, the inventive recording material is a "declining balance" gift card or credit voucher which serves as a debit card and displays (or is capable of displaying) the original and declining value of the card or voucher.

5 Claims, 1 Drawing Sheet

U.S. PATENT DOCUMENTS

| | | | |
|---|---|---|---|
| 6,843,422 | B2 | 1/2005 | Jones et al. |
| 6,867,983 | B2 | 3/2005 | Liu et al. |
| 7,322,519 | B2 * | 1/2008 | Blank et al. .................. 235/380 |
| 7,337,957 | B2 * | 3/2008 | Ashizaki et al. ............. 235/382 |
| 2004/0155104 | A1 * | 8/2004 | Mitchell, Jr. ................. 235/380 |
| 2004/0173686 | A1 * | 9/2004 | Al Amri ..................... 235/492 |
| 2005/0116027 | A1 * | 6/2005 | Algiene et al. .............. 235/380 |

FOREIGN PATENT DOCUMENTS

| | | |
|---|---|---|
| EP | 1 234 681 A | 8/2002 |
| EP | 1 502 764 A | 2/2005 |
| JP | 60 264289 A | 12/1985 |
| JP | 62 290576 A | 12/1987 |
| WO | WO 03/091041 A | 11/2003 |

\* cited by examiner

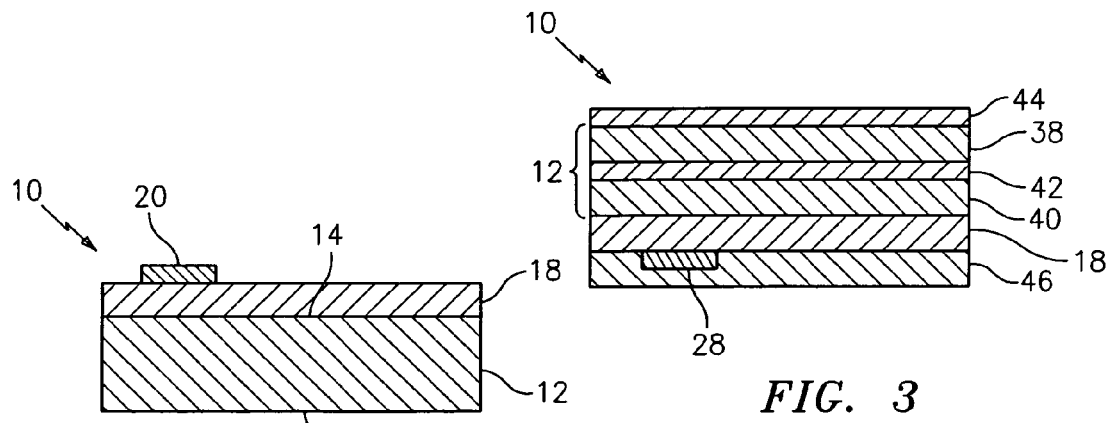
FIG. 1
FIG. 3
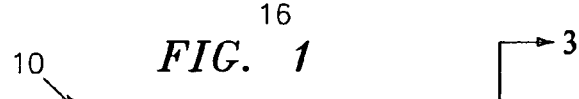
*The International Resort & Club*
1-800-800-8000
wow.TIRC.com
FIG. 2a
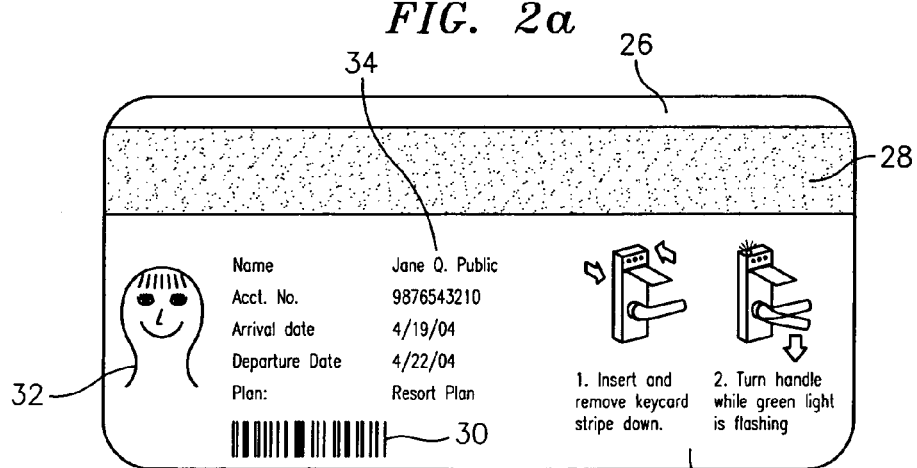
| Name | Jane Q. Public |
| Acct. No. | 9876543210 |
| Arrival date | 4/19/04 |
| Departure Date | 4/22/04 |
| Plan: | Resort Plan |
1. Insert and remove keycard stripe down.
2. Turn handle while green light is flashing
FIG. 2b

MULTIFUNCTION, DIRECT THERMAL RECORDING MATERIAL

RELATED APPLICATION

This application claims priority from U.S. Provisional Patent Application Ser. No. 60/583,722, filed Jun. 29, 2004.

TECHNICAL FIELD OF THE INVENTION

The present invention basically relates to a multifunction, direct thermal recording material, and more particularly relates to (i) a guest card issued by a hotel or hospitality establishment which serves as an identification card as well as a room access "key card", and (ii) a "declining balance" gift card or credit voucher issued by a commercial establishment which serves as a debit card and displays (or is capable of displaying) the original and declining value of the card or voucher.

BACKGROUND OF THE INVENTION

Upon registering at an electronically protected hotel, a guest is provided with a magnetic key card. After locating his/her hotel room, the guest will insert the magnetic key card into a slot near the door handle, wait for a green light to go on (which indicates that the key card worked), and then turn the handle and enter the room. The value of this key card system in a hotel setting is readily apparent: no problem with lost keys compromising security. After each guest checks out, the key cards are invalidated by a computer at the front desk even if they aren't turned in. The next guest gets a new and unique card.

The hotel guest may also be provided with a separate guest card, which identifies the individual as a guest of the hotel and allows the guest to charge at any of the hotel's facilities. Such a card typically displays the guest's name, account number, as well as arrival and departure dates.

Providing a hotel guest with multiple cards at check-in can be costly and inefficient. Also, it is not uncommon for a guest to misplace one of his/her cards, which absorbs more of the hotel's time and resources replacing them.

A need therefore exists for streamlining these check-in procedures.

Referring now to gift cards or credit vouchers, organizations often provide gift certificates for purchase that are usually in the form of a plastic credit card. The card is uniquely designed and customized to represent the corporation, business, brokerage firm, retailer or university for which the card is made.

So-called "declining balance" gift cards or credit vouchers are designed to be reused until the value on the card is fully depleted. Cards may typically be reloaded or recharged so that customers may use them over and over again. Unfortunately, real time gift card balance information is not discernable upon viewing the card.

A need therefore exists for "declining balance" gift cards which display real time gift card balance information.

In view of the above, an object of the present invention is to provide a multifunction, direct thermal recording material that overcomes the noted drawbacks associated with the check-in procedure at hotels and with prior art "declining balance" gift cards.

SUMMARY

The present invention therefore provides a multifunction, direct thermal recording material that in one embodiment is a guest card issued by a hotel or hospitality establishment which serves as both an identification card as well as a room access "key card", and that in another embodiment is a "declining balance" gift card or credit voucher issued by a commercial enterprise which serves as a debit card and displays (or is capable of displaying) the original and declining value of the card or voucher.

The present invention more particularly provides a multifunction, direct thermal recording material, which comprises: a base support having opposing planar surfaces; at least one thermal recording layer formed on at least one such planar surface for displaying a digital photographic image, graphical, numerical or textual information, or combinations thereof; and at least one machine readable information storage system (e.g., magnetic stripes, bar codes, radio frequency identifiers) contained on or within the base support and/or the thermal recording layer.

Other features and advantages of the invention will be apparent to one of ordinary skill from the following detailed description and accompanying drawings.

Unless otherwise defined, all technical and scientific terms used herein have the same meaning as commonly understood by one of ordinary skill in the art to which this invention belongs. All publications, patent applications, patents and other references mentioned herein are incorporated by reference in their entirety. In case of conflict, the present specification, including definitions, will control. In addition, the materials, methods, and examples are illustrative only and not intended to be limiting.

BRIEF DESCRIPTION OF THE DRAWINGS

Particular features of the disclosed invention are illustrated by reference to the accompanying drawings in which:

FIG. 1 is a cross-sectional view of one embodiment of the multifunction, direct thermal recording material of the present invention;

FIGS. 2*a* and 2*b* show the printable front side and thermal back side of a more preferred embodiment of the direct thermal recording material of the present invention; and FIG. 3 is a cross-sectional view of the more preferred embodiment shown in FIG. 2, taken along lines 3-3.

BEST MODE FOR CARRYING OUT THE INVENTION

Adding direct thermal imaging capability to keys used in "smart key" or "key control" systems allows electronically protected establishments such as hotels to streamline the check-in procedure. It also allows these establishments to produce digital images on the keys which provides for increased security on hotel property, reduced fraud at retail establishments located on hotel property, as well as record keeping of guests on a recorded photo base, allowing the hotel to track guests in the event of e.g., undesirable activity. Adding direct thermal imaging capability to gift cards or credit vouchers allows commercial enterprises to thermally image the initial value of the gift card as well as "declining balance" debit transactions on the card.

As will be readily appreciated, performance requirements are heightened for products used in the contemplated end-use applications. For example, applying a direct thermal layer to a product that will be subjected to repeated physical contact with a slot contained within a magnetic key card system requires that the direct thermal layer have enhanced durability and that the recording material have increased stiffness.

The present inventive direct thermal recording material is suitable for use in such demanding product applications.

Other contemplated end-use applications for the multifunction, direct thermal recording material of the present invention include, but are not limited to, boarding passes, business cards, identification cards, labels, licenses (e.g., driver's licenses, gaming licenses), passports, tags, tickets, and wrist bands (e.g., hospital wrist bands, resort wrist bands, water park wrist bands).

As best shown in FIG. 1, the multifunction, direct thermal recording material of the present invention, which is generally designated by reference numeral 10, basically comprises:
(1) a base support 12 having opposing planar surfaces 14, 16;
(2) at least one thermal recording layer 18 formed on at least one such planar surface for displaying a digital photographic image, graphical, numerical, or textual information, or combinations thereof; and
(3) at least one machine readable information storage system 20 contained on or within the base support 12 and/or the thermal recording layer 18.

Base support 12 may take the form of either a solid core base support or a laminated structure comprising at least two laminated base sheets, with suitable base sheets including those prepared from paper, synthetic resin films (preferably, synthetic resin films having a dyne level of greater than or equal to 35), metal foils, woven fabrics, and non-woven fabrics.

For those embodiments where base support 12 is a solid core base support, base support 12 may be prepared from any suitable material including the above-referenced materials, namely, paper, synthetic resin films (e.g., polycarbonate, polyester, polyethylene, polypropylene and polyvinylchloride synthetic resin films), metal foils, and woven and non-woven fabrics, and is preferably prepared from high dyne level synthetic resin films.

For those embodiments where base support 12 is a laminated structure, base support 12 preferably comprises one of the following laminated structures:
(1) paper laminated to: paper, synthetic resin films, metal foils, woven fabrics and/or nonwoven fabrics (e.g., non-woven spunbonded olefin sheets available from E. I. du Pont de Nemours and Company, 1007 Market Street, Wilmington Del. 19898 ("DuPont"), under the product designation TYVEK nonwoven sheets);
(2) synthetic resin films laminated to: synthetic resin films, metal foils, woven fabrics and/or nonwoven fabrics;
(3) metal foils laminated to: metal foils, woven fabrics and/or nonwoven fabrics;
(4) woven fabrics laminated to: woven fabrics and/or nonwoven fabrics; and
(5) nonwoven fabrics laminated to: nonwoven fabrics.

In a more preferred embodiment, base support 12 is a film-to-film, paper-to-film, or paper-to-paper laminated structure.

The film and/or paper base sheets are preferably laminated together using a thermoplastic polymeric binder for which the Vicat softening temperature is in the range of between about 20° C. and about 180° C., preferably between about 30° C. and about 160° C. Such binder materials as well as lamination techniques are described in U.S. Pat. No. 4,727,055 to Aoyagi et al.

Base support 12 preferably has a thickness ranging from about 100 to about 1000 microns (μ), a basis weight ranging from about 50 to about 1500 grams per square meter (g/m$^2$), a surface smoothness of from about 10 to about 10,000 Bekk seconds, and a stiffness of at least about 0.3 millinewton per meter (mNm) (measured in accordance with TAPPI T489 test method using a TABER Stiffness Tester (model number 150-B)).

Thermal recording layer 18 is prepared from an aqueous coating formulation that comprises: a colorless or pale-colored basic dye; a color developer capable of inducing color formation in the basic dye when heated to a suitable temperature; and a binder.

Basic dyes suitable for use in the present invention are known and include, but are not limited to: 3,3-bis(p-dimethylaminophenyl)-6-dimethylaminophthalide, 3-cyclohexylamino-6-chlorofluoran, 3-dimethylamino-6-methyl-7-chlorofluoran, rhodamine(o-chloroanilino)lactam, 3-(N-ethyl-p-toluidino)-7-methylfluoran, 3-diethylamino-6,8-dimethylfluoran, 3-(N-ethyl-N-isoamylamino)-6-methyl-7-anilinofluoran, 3-(N-methyl-N-cyclohexylamino)-6-methyl-7-anilinofluoran, 3-diethylamino-6-methyl-7-anilinofluoran, 3-di(n-butyl)amino-6-methyl-7-anilinofluoran, 3-di(n-pentyl)amino-6-methyl-7-anilinofluoran, 3-di(n-butyl)amino-7-(o-chlorophenylamino)fluoran, 3-(N-ethyl-p-toluidino)-6-methyl-7-anilinofluoran, 3-diethylamino-7-(m-trifluoromethylanilino)fluoran, 3-diethylamino-6-chloro-7-anilinofluoran, 3-dimethylamino-6-methyl-7-anilinofluoran, 3-di(n-butyl)amino-6-methyl-7-m-toluidinofluoran, 3-(N-ethyl-N-ethoxypropylamino)-6-methyl-7-anilinofluoran, 3-(N-methyl-N-n-propylamino)-6-methyl-7-anilinofluoran, 3,3-bis[1-(4-methoxyphenyl)-1-(4-dimethylaminophenyl) ethylene-2-yl]-4,5,6,7-tetrachlorophthalide, 3-(4-dimethylaminophenylamino)-5, 7-dimethylfluoran, 3-(4-di(n-butyl) aminophenylamino)-6-methyl-7-chlorofluoran, 3,3-bis(4-diethylamino-2-ethoxyphenyl)-4-azaphthalide, and mixtures thereof. In a preferred embodiment, the basic dye is selected from the group of:
(1) 3-di(n-butyl)amino-6-methyl-7-anilinofluoran, which is available from Yamada Chemical Co., Ltd., 1-1 Kamichoshi-cho, Kamitoba, Minami-Ku, Kyoto 601, JAPAN ("Yamada Chemical"), under the product designations BLACK 400;
(2) 3-(N-ethyl-N-isoamylamino)-6-methyl-7-anilinofluoran, which is available from Yamada Chemical, under the product designation S-205;
(3) 3-di(n-pentyl)amino-6-methyl-7-anilinofluoran, which is available from Yamada Chemical, under the product designations Black 305; and
(4) 3-(N-ethyl-p-toluidino)-6-methyl-7-anilinofluoran, which is available from Yamada Chemical, under the product designations LDK 1003 or ET AC.

Color developers suitable for use in the present invention are also known and include, but are not limited to: 2,2-bis(4-hydroxyphenyl)propane, 4,4'-(1,3-dimethylbutylidene) diphenol, 1,1-bis(4-hydroxyphenyl)-1-phenylethane, 4,4'-dihydroxydiphenylsulfone, 2,4'-dihydroxydiphenylsulfone, 4-hydroxy-4'-isopropoxydiphenylsulfone, bis(3-allyl-4-hydroxyphenyl)sulfone, N-(p-toluenesulphonyl)-N'-(3-p-toluenesulphonyloxyphenyl)urea. In a preferred embodiment, the color developer is selected from the group of:
(1) bis(3-allyl-4-hydroxyphenyl)sulfone, which is available from Nippon Kayaku Co., LTD, Functional Products Division, 11-2 Fujimi I-Chome, Chiyoda-Ku, Tokyo 102, Japan, under the product designation TG-SA or TG-SH; and
(2) N-(p-toluenesulphonyl)-N'-(3-p-toluenesulphonyloxyphenyl)urea, which is available from Ciba Specialty Chemicals, P.O. Box 2, Ashton New Road Clayton, Manchester M11 4 AP, UNITED KINGDOM, under the product designation PERGAFAST 201.

Various types of binders may be employed for binding and supporting the basic dyes and color developers of the aqueous coating formulation used to form thermal recording layer 18. Examples of such binders include, but are not limited to, casein, cellulose and cellulose derivatives (e.g., methyl ether cellulose, methoxy cellulose, hydroxyethyl cellulose, hydroxypropyl methylcellulose, carboxymethyl cellulose, sodium carboxymethyl cellulose, methyl cellulose and ethyl cellulose), gelatin, gum arabic, natural starches (e.g., potato, corn), starch derivatives, polyvinyl alcohol (PVA), PVA derivatives (e.g., carboxyl-modified PVA, acetoacetyl group-modified PVA, silicon-modified PVA), resins (e.g., amide resin, melamine resin, polyurethane resin, urea resin), copolymers (e.g., diisobutylene-maleic anhydride copolymer, styrene-maleic anhydride copolymer, ethylene-acrylic acid copolymer, styrene-acrylic acid copolymer, acetoacetyl group-modified PVA-acrylic amide-acrylic acid copolymer), styrene-butadiene copolymer emulsions, and the like. In a preferred embodiment, the binder is selected from the group of:

(1) super, fully and partially hydrolyzed PVAs (i.e., % hydrolysis ranging from about 87 to about 100%, average degree of polymerization equal to from about 300 to about 3500), available from:
  (a) DuPont, under the product designations: ELVANOL 70-03 (hydrolysis: 99%, average degree of polymerization: 300); ELVANOL 90-50 (hydrolysis: 99%, average degree of polymerization: 1,000); ELVANOL 51-05 (hydrolysis: 88%, average degree of polymerization: 500); and ELVANOL 52-22 (hydrolysis: 88%, average degree of polymerization: 1,700); and
  (b) Kuraray Co. Ltd., 1-1-88, Oyodonaka, Kita-ku, Osaka JAPAN ("Kuraray Co."), under the product designations: PVA105 (hydrolysis: 99%, average degree of polymerization: 500); PVA110 (hydrolysis: 99% average degree of polymerization: 1,000); PVA117 (hydrolysis: 99%, average degree of polymerization: 1,700); PVA124 (hydrolysis: 99%, average degree of polymerization: 2,400); PVA203 (hydrolysis: 88%, average degree of polymerization: 300); PVA205 (hydrolysis: 88%, average degree of polymerization: 500); PVA210 (hydrolysis: 88%, average degree of polymerization: 1,000); PVA217 (hydrolysis: 88%, average degree of polymerization: 1,700); and PVA235 (hydrolysis: 88%, average degree of polymerization: 3,500);

(2) PVA derivatives, available from:
  (a) The Nippon Synthetic Chemical Industry Co. Ltd., 12-1, Nihonbashi 3-Chome, Chuo-ku, Tokyo 103 JAPAN, under the product designation GOHSEFIMER Z-200 acetoacetyl group-modified PVA;
  (b) Kuraray Co., under the product designation R-1130 silicon-modified PVA; and
  (c) Harima Chemicals Inc., 67-14 Mizuashi, Noguchi-Cho, Kakogawa, Hyogo 675 JAPAN, under the product designation HARICOAT B1-736 acetoacetyl group-modified PVA-acrylic amide-acrylic acid copolymer;

(3) Starch derivatives, available from:
  (a) National Starch & Chemical Company, Findeme Ave., P.O. Box 6500, Bridgewater, N.J. 08807, under the product designation FIBERSIZE 47-3175 oxidized corn starch;
  (b) Avebe America Inc., Princeton Corporate Center, 4 Independence Way, Princeton, N.J. 08543, under the product designation SOLFAREX 2530 starch ether; and
  (c) Nippon Starch Chemical Co. Ltd., 3-29, Mitsuyakita 3-Chome, Yodogawa-ku, Osaka 532-0032 JAPAN, under the product designation PETROCOAT C-8 graft copolymerized starch; and (4) styrene-butadiene copolymer emulsions, available from The Dow Chemical Company, 1790 Building, Washington Street Midland Mich. 48674, under the product designation DOW CP-620 styrene-butadiene copolymer emulsions.

In addition to the above components, the aqueous coating formulation used to prepare thermal recording layer 18 can advantageously contain other additives such as sensitizers, inorganic pigments, surface active agents, thermofusible materials, and the like.

Examples of suitable sensitizers include, but are not limited to, stearic acid amide, methoxycarbonyl-N-stearic acid benzamide, stearic acid ethylenebisamide, stearic acid methylenebisamide, stearic acid N-methylolamide, dibenzyl terephthalate, benzyl p-benzyloxybenzoate, 2-naphthylbenzyl ether, m-terphenyl, dibenzyl oxalate, di-p-methylbenzyl oxalate, di-p-chlorobenzyl oxalate, p-benzylbiphenyl, di(p-methoxyphenoxyethyl)ether, 1,2-bis(3-methylphenoxy)ethane, 1,2-bis(4-methylphenoxy)ethane, 1,2-bis(4-methoxyphenoxy)ethane, 1,2-diphenoxyethane, 1-(4-methoxyphenoxy)-2-(3-methoxyphenoxy)ethane, p-methylthiophenyl benzyl ether, 1,4-di(phenylthio)butane, p-biphenyl-p-tolyl ether, N-acetoacetyl-p-toluidine, di-(B-biphenylethoxy)-benzene, p-di(vinyloxyethoxy) benzene, 1-isopropylphenyl-2-phenylethane, I-phenoxy-2-(2-naphthoxy)ethane,1,3-bis(2-naphthoxy)propane, 1-(2-naphthoxy)-2-(4-methylphenoxy)ethane, 1,2-di(m-tolyloxy)ethane, di(4-methylbenzyl)oxalate and mixtures thereof. In a preferred embodiment, the sensitizer is selected from the group of:

(1) 1,2-di(m-tolyloxy)ethane and 1,2-diphenoxyethane, which are available from Sanko Chemical Industries Co., Ltd., 3-10-6, Tadaoka-kita, Tadaoka-cho, Senboku-gun, Osaka, JAPAN, under the product designations KS-232 and KS-235; and (2) di-(4-methylbenzyl)oxalate, which is available from Dainippon Ink & Chemicals Inc., 7-20, Nihonbashi 3-chome, Chuo-ku, Tokyo, 103 JAPAN, under the product designation HS-3520.

Examples of suitable inorganic pigments include, but are not limited to, aluminum hydroxide, amorphous silica, calcined clay, calcium carbonate, calcium silicate, clay, kaolin, silicic anhydride, talc, titanium dioxide and the like. In a preferred embodiment, the inorganic pigment(s) is selected from the group of:

(1) amorphous silica, which is available from J.M. Huber Corp., Chemicals Division, P.O. Box 310, Havre De Grace, Md. 21078, under the product designation ZEOTHIX 177;

(2) clay, which is available from Engelhard Corp., Paper Pigment and Chemical Group, 101 Wood Avenue, Iselin, N.J. 08830, under the product designation Ultra White 90;

(3) aluminum hydroxide, which is available from Aluminum Company of America, P.O. Box 300, Bauxite, Ark. 72011, under the product designation HYDRAL 710; and (4) calcium carbonate, which is available from Mississippi Lime Company, P.O. Drawer 31, Highway 61, Ste. Genevieve, Mo. 63670, under the product designation Magnum Gloss.

Examples of surface active agents include, but are not limited to, sodium bis-tridecyl sulfosuccinate in a mixture of ethyl alcohol, methyl alcohol and water, and sodium bis-octyl sulfosuccinate in a mixture of ethyl alcohol and water. In a preferred embodiment, the surface active agent(s) is sodium bis-octyl sulfosuccinate in a mixture of ethyl alcohol and water, which is available from American Cyanamid Company, Wayne, N.J. 07470, under the product designation AEROSOL OT 75% Aqueous.

Examples of thermofusible materials include, but are not limited to, waxes such as paraffin wax and olefin wax, calcium stearate, zinc stearate, and the like. In a preferred embodiment, the thermofusible material(s) is selected from the group of:

(1) paraffin wax, which is available from Cytech Products Inc., 906 Peterson Dr., Elizabethtown, Ky. 42701 ("Cytech Products"), under the product designation HIDORIN P-7; and (2) zinc stearate, which is available from Cytech Products, under the product designation HIDORIN Z-8.

In accordance with a preferred embodiment, the thermal recording layer 18 of the present invention is prepared using a coating formulation comprising:

(1) from about 3 to about 40% by wt. (more preferably, from about 4 to about 35% by wt., and most preferably, from about 5 to about 30% by wt.), based on the total weight of the coating formulation, of a basic dye selected from the group including 3-di(n-butyl)amino-6-methyl-7-anilinofluorane, 3-(N-ethyl-N-isoamylamino)-6-methyl-7-anilinofluorane, 3-di(n-pentyl)amino-6-methyl-7-anilinofluoran, 3-(N-ethyl-p-toluidino)-6-methyl-7-anilinofluoran, and combinations thereof;

(2) from about 3 to about 50% by wt. (more preferably, from about 4 to about 45% by wt., and most preferably, from about 5 to about 40% by wt.), based on the total weight of the coating formulation, of a color developer selected from the group including bis(3-allyl-4-hydroxyphenyl)sulfone, N-(p-toluenesulphonyl)-N'-(3-p-toluenesulphonyloxyphenyl)urea, and combinations thereof; and (3) from about 2 to about 60% by wt. (more preferably, from about 5 to about 50% by wt., and most preferably, from about 10 to about 40% by wt.), based on the total weight of the coating formulation, of a binder selected from the group including PVA, PVA derivatives, starches, starch derivatives, styrene-butadiene copolymer emulsions, and combinations thereof.

In accordance with a more preferred embodiment, the thermal recording layer 18 further comprises:

from about 1 to about 60% by wt. (more preferably, from about 5 to about 50% by wt., and most preferably, from about 10 to about 40% by wt.), based on the total weight of the coating formulation, of a sensitizer selected from the group of 1,2-di(m-tolyloxy)ethane and 1,2-diphenoxyethane;

from about 0 to about 40% by wt. (more preferably, from about 5 to about 30% by wt., and most preferably, from about 10 to about 20% by wt.), based on the total weight of the coating formulation, of an inorganic pigment selected from the group of aluminum hydroxide, calcium carbonate, clay, silica, and mixtures thereof; and from about 0.01 to about 1.0% by wt. (more preferably, from about 0.05 to about 0.75% by wt., and most preferably, from about 0.1 to about 0.5% by wt.), based on the total weight of the coating formulation, of a surface active agent selected from the group of sodium bis-tridecyl sulfosuccinate (in a mixture of ethyl alcohol, methyl alcohol and water), sodium bis-octyl sulfosuccinate (in a mixture of ethyl alcohol and water), and combinations thereof.

The coating formulation used to prepare the thermal recording layer 18 is made by mixing the components with water so as to obtain an aqueous composition having a solids content ranging from about 5 to about 80%, based on the total weight (dry basis) of the coating formulation. The coating formulation may then be applied to base support 12 using either high shear coating applications such as those that involve the use of e.g., blade coaters, or low shear coating applications such as those that involve the use of e.g., air knife coaters, rod coaters or gravure coaters.

It is preferred that the coating formulation be applied so as to achieve an average coat weight that ranges from about 0.1 to about 50 grams per square meter (g/m$^2$), based on the total weight (dry basis) of the coating formulation.

Drying can be accomplished by any known method or technique including room temperature air drying, hot air drying, or heat radiation drying.

The temperature for developing color in the thermal recording layer 18 (i.e., heat activation temperature) is greater than or equal to 40° C.

The term "heat activation temperature", as used herein, is intended to mean the temperature at which images having an image density of at least 1.00 (when measured by an X-Rite 418 Reflectance Densitometer, manufactured by X-Rite, Incorporated, 3100 44th Street, SW Grandville, Mich. 49418, using an appropriate filter (e.g., visual filter)) are formed in the thermal recording layer 18.

The machine readable information storage system 20 contained on or within the base support 12 and/or the thermal recording layer 18, at a minimum, stores information or data and delivers the stored information or data to readers when scanned. Examples include magnetic stripes, one- and two-dimensional bar-codes, text recognizable by an optical character recognition device, images recognizable by a video image recognition device, radio frequency identifiers, and the like.

Magnetic stripes contain "tracks" of magnetically encoded information. More specifically, these stripes can contain one, two, or three "tracks" of information, with the first two tracks typically containing standard information used in transaction processing, such as a person's name and account number, and with the third track typically containing more personal, demographic information. The magnetically encoded information contained within these tracks may be read using conventional magnetic stripe readers.

Bar codes are typically made up of one or more rows of light and dark regions, typically in the form of rectangles. The widths of the dark regions (i.e., the bars) and/or the widths of the light regions (i.e., the spaces between the bars), when partitioned into groups, indicate encoded information to be read. The encoded information formed by bar codes may be read using conventional electro-optical scanners, such as bar code symbol scanners.

Radio frequency identifiers or RFIDs are microelectronic elements in the form of small electronic modules or blocks. These blocks house or contain: (a) memory circuitry for storing information and/or microprocessors (or electronic processing circuitry) for manipulating information stored in associated memory; (b) contactless interfaces (e.g., antenna and supporting circuitry); and optionally (c) internal power sources. See, e.g., U.S. Pat. Nos. 5,721,781, 5,955,961, 6,000,607, 6,047,888, 6,193,163, 6,199,144, 6,202,932, 6,244,514, 6,247,644, 6,257,486, 6,424,029, 6,485,319, and 6,843,422.

RFIDs are capable of performing a variety of functions, including, but not limited to, storing information and data, manipulating or processing such information and data, controlling access (e.g., by carrying pass codes, passwords, etc.), providing identifying information, etc.

RFIDs may be added to, or embedded within, the multifunction, direct thermal recording material 10 of the present invention using conventional methods and techniques. For example, an RFID may be inserted into a pre-drilled hole located in base support 12 and then bonded in place using, for example, a melt flowing adhesive.

The information and data stored and possibly manipulated or processed by the RFIDs may be read using, for example, conventional smart card readers.

In addition to that noted above, for those embodiments of the present invention containing only one thermal recording layer 18, the inventive recording material 10 may also comprise a printable surface or layer opposite the planar surface containing the thermal recording layer 18. In one such embodiment, base support 12 is prepared from a high dyne level synthetic resin film, thereby providing backside printability to recording material 10.

The printable surface or layer of recording material 10 may be printed using lithography, flexo, letterpress, and screen presses.

The direct thermal recording material 10 of the present invention may further comprise one or more outer protective layers. An outer protective layer will serve to protect the thermal recording layer 18 from surface damage caused by scratching etc., from damage caused by oils, plasticizers and water, and will prevent direct contact of printheads or heat sources with the recording layer 18. Suitable protective layers for thermal recording layer 18 which come into contact with and have to be transported past a heat source under pressure, have to exhibit resistance to local deformation and good slipping characteristics during transport past the heat source during heating. Materials suitable for use in forming an outer protective layer(s) for use with recording material 10 include, but are not limited to, pigments, binders, lubricants, surfactants and the like.

In a preferred embodiment, the outer protective layer comprises:
  (1) from about 0 to about 90% by wt. (more preferably, from about 10 to about 80% by wt., and most preferably, from about 30 to about 70% by wt.), based on the total weight of the coating formulation, of a clay pigment; and
  (2) from about 100 to about 10% by wt. (more preferably, from about 90 to about 20% by wt., and most preferably, from about 70 to about 30% by wt.), based on the total weight of the coating formulation, of a PVA binder.

The coating formulation is prepared by mixing the components with water so as to obtain an aqueous composition having a preferred solids content ranging from about 5 to about 70%, based on the total weight (dry basis) of the coating formulation. The coating formulation may then be applied to the thermal recording layer 18 using either high or low shear coating applications.

It is preferred that the coating formulation be applied so as to achieve an average coat weight that ranges from about 0.5 to about 10 g/m$^2$, based on the total weight (dry basis) of the coating formulation. Drying can be accomplished by any known method or technique.

In a more preferred embodiment of the present invention, direct thermal recording material 10 is a guest card which serves to identify a hotel guest and to provide that guest with room access. As best shown in FIGS. 2a and 2b, the inventive recording material 10 comprises a printable front side or upper surface 22, which contains printed information 24 about the issuing hotel or hospitality suite, and a thermal back side or lower surface 26, which contains an encodable magnetic stripe 28, a scannable bar code 30, a digital photographic image of the hotel guest 32, printed information about the guest 34, and instructions 36 for use of the "key" card.

In a cross-sectional view of this more preferred embodiment, which is shown in FIG. 3, it can be seen that the inventive direct thermal recording material 10 comprises: base support 12, which is made up of two base sheets 38, 40, laminated together via binder layer 42; thermal recording layer 18; encodable magnetic stripe 28; printable surface or layer 44; and outer protective layer 46.

As will be readily appreciated, the inventive direct thermal recording material 10 provides increased efficiency by streamlining the method used for guest registration and record keeping and by eliminating the need for issuing multiple cards containing duplicate information. The inventive recording material 10 provides access to a guest's hotel room and may also provide access to other secured areas such as fitness centers and parking garages.

The inventive recording material 10 also increases security. For example, the encodable magnetic stripe 28 and scannable bar code 30 may contain the same information. As such, should the magnetic stripe 28 be rewritten or altered in any way, such an alternation may be readily detected by hotel personnel using a device designed to compare and detect differences in the encoded information.

In another more preferred embodiment of the present invention, the multifunction, direct thermal recording material 10 is a "declining balance" gift card or credit voucher which serves as a debit card and displays the original and declining value of the card or voucher.

Although the present invention has been shown and described with respect to detailed embodiments thereof, it will be understood by those skilled in the art that various changes in form and detail thereof may be made without departing from the spirit and scope of the claimed invention.

Having thus described the invention, what is claimed is:

1. A guest card which serves to identify a hotel guest and to provide that guest with room access, which is suitable for insertion into reading devices such as slotted key card systems on a recurring basis, and which comprises: a base support having opposing planar surfaces; at least one thermal recording layer formed on at least one planar surface of the base support for displaying a digital photographic image, graphical, numerical or textual information, or combinations thereof; and at least one machine readable information storage system contained on or within the base support and/or the thermal recording layer, wherein the base support has a printable front side or upper surface, which contains printed information about an issuing hotel or hospitality suite, and a thermal back side or lower surface, which contains an encodable magnetic stripe, a scannable bar code, a digital photographic image of the hotel guest, printed information about the guest, and instructions for use of the card.

2. The guest card of claim 1, wherein the base support contains one or more radio frequency identifiers.

3. A gift card or credit voucher which serves as a debit card and which displays or is capable of displaying original and current values of the card or voucher, which comprises: a base support having opposing planar surfaces; at least one thermal recording layer formed on at least one planar surface of the base support for displaying a digital photographic image, graphical, numerical or textual information, or combinations thereof; and at least one machine readable information storage system contained on or within the base support and/or the thermal recording layer, wherein the thermal recording layer is prepared from an aqueous coating formulation that comprises:

(1) from about 3 to about 40% by wt., based on the total weight of the coating formulation, of a basic dye selected from the group of 3-di(n-butyl)amino-6-methyl-7-anilinofluorane, 3-(N-ethyl-N-isoamylamino)-6-methyl-7-anilinofluorane, 3-di(n-pentyl)amino-6-methyl-7-anilinofluoran, 3-(N-ethyl-p-toluidino)-6-methyl-7-anilinofluoran, and combinations thereof;

(2) from about 3 to about 50% by wt., based on the total weight of the coating formulation, of a color developer selected from the group of bis(3-allyl-4-hydroxyphenyl) sulfone, N-(p-toluenesulphonyl)-N'-(3-p-toluenesulphonyloxyphenyl)urea, and combinations thereof; and (3) from about 2 to about 60% by wt., based on the total weight of the coating formulation, of a binder selected from the group of polyvinyl alcohol, polyvinyl alcohol derivatives, starches, starch derivatives, styrene-butadiene copolymer emulsions, and combinations thereof.

4. A guest card which serves to identify a hotel guest and to provide that guest with room access, which is suitable for insertion into reading devices such as slotted key card systems on a recurring basis, and which comprises: a base support having opposing planar surfaces; at least one thermal recording layer formed on at least one planar surface of the base support for displaying a digital photographic image, graphical, numerical or textual information, or combinations thereof; and at least one machine readable information storage system contained on or within the base support and/or the thermal recording layer, wherein the base support has a thickness ranging from about 100 to about 1000 microns, a basis weight ranging from about 50 to about 1500 grams per square meter, a surface smoothness of from about 10 to about 10,000 Bekk seconds, and a stiffness of at least about 0.3 millinewton per meter (TAPPI T489).

5. A guest card which serves to identify a hotel guest and to provide that guest with room access, which is suitable for insertion into reading devices such as slotted key card systems on a recurring basis, and which comprises: a base support having opposing planar surfaces; at least one thermal recording layer formed on at least one planar surface of the base support for displaying a digital photographic image, graphical, numerical or textual information, or combinations thereof; and at least one machine readable information storage system contained on or within the base support and/or the thermal recording layer, wherein the thermal recording layer is prepared from an aqueous coating formulation that comprises: a colorless or pale-colored basic dye; a color developer capable of inducing color formation in the basic dye when heated to a suitable temperature; and a binder.

* * * * *